March 2, 1971 J. A. YOBLIN 3,567,407
COMPOSITE MATERIALS
Filed June 27, 1966

INVENTOR.
JACK A. YOBLIN
BY
Kenway, Jenney, & Hildreth
ATTORNEYS 3,567,407
COMPOSITE MATERIALS
Jack A. Yoblin, South Acton, Mass., assignor to Whittaker Corporation, Los Angeles, Calif.
Filed June 27, 1966, Ser. No. 560,648
Int. Cl. B21c 23/22; B32b 15/00
U.S. Cl. 29—191.4                                    10 Claims

ABSTRACT OF THE DISCLOSURE

A composite structure is formed from a plurality of extended filamentary fibers, each coated with a protective cladding. The fibers are aligned parallel to each other, bundled together in an extrusion canister, and coextruded to form a monolithic structure in which the cladding forms a continuous, honeycomb-type matrix uniformly extrusion-bonded to the fibers and separating them from each other. The fibers are chosen for their high strength while the protective cladding is chosen for its ability to protect the fibers from their environment or from each other.

BACKGROUND OF THE INVENTION

My invention relates to a composite metallic structure. In particular, it relates to a novel cladded metallic structure and to a method of making the same.

Recent advances in technology have created strong demands for materials which possess superior strength and other desirable characteristics and which are capable of operating at elevated temperatures and pressures in adverse environments. Most of the present high temperature materials having adequate strength characteristics are usually susceptible to attack by "contaminants" such as oxygen, sulphur, etc., and accordingly must be protected from these contaminants under actual operating conditions. One technique which has been developed to provide this protection is to clad the high strength or base material with an outer shell of material which may be of lower strength but which possesses superior contamination resistance. In some instances this protection can be applied by plasma jet spraying as is the case with some high temperature materials which are to be protected from oxidation. In other instances the cladding material takes the form of a relatively thin-walled tube which is snugly fitted around the base material, the resultant composite then being fed through an extrusion die which has a much smaller cross-sectional area than that of the cladded material. This extrusion process, in addition to reducing the cross-sectional area of the material, can provide a strong bond between the two materials if the materials are properly treated before being extruded.

In order to insure that the cladded structure possesses the strength or other defining characteristics of the base material, the outer cladding material is normally maintained relatively thin. Structures of this type, while providing a certain degree of protection against adverse environmental conditions, suffer the serious disadvantage that even minute flaws in the outer cladding caused by penetration of foreign objects will expose the base material to the adverse environment, thus leading to ultimate failure of the composite. This problem is especially acute when materials of this nature are utilized in the turbine blades of jet engines which are required to operate under high stresses at elevated temperatures in an environment contaminated by the combustion products of the jet engine fuel utilized in the turbine. In such an environment, certain types of materials possessing superior strength characteristics are subject to sublimation on penetration of the outer cladding, thus leading to ultimate failure in the particular turbine blade which has been attacked. Another approach to the solution of this problem has been to agglomerate a large number of fibers or strands of the material to be protected into a porous base structure whose voids or pores are then impregnated with a protective filler material by methods such as dipping and the like. This technique also fails to provide an adequate solution to the problem since it is difficult to ensure that each strand is adequately and uniformly coated. Further, the high volume ratio of void space to filled fiber space in the agglomerate structure results in a high volume ratio of filler material to base material which "dilutes" the contribution of the base material to the resultant structure in an undesirable manner.

BRIEF SUMMARY OF THE INVENTION

I have found that a superior metallic structure may be formed by packing a large number of individually clad metallic rods or filaments inside a cannister or shell of protective material and extruding the resultant bundle to form a billet of a new composite structure in which the cladding material assumes the form of a honeycomb-type structure, the cells of which are completely filled by the base material which is to be protected and in which a strong bond is formed between the honeycomb-type structure and the base material. Since each filament comprises a core of base material which is protected by its own individual layer of cladding, penetration of one cell will cause damage which is confined to that cell alone and which will not affect other cells in the structure. In one embodiment of my invention the filaments have the form of extended cylindrical cores snugly fitted inside individual outer shells of cladding material. In another embodiment of my invention the filaments have the form of a plurality of extended cylindrical cores snugly fitted inside an outer shell of cladding material; if desired, each core may be separated from other cores within the shell by spacers of cladding material.

Accordingly, it is an object of my invention to provide a superior composite metallic structure. Another object of my invention is to provide a superior composite material comprising a plurality of extended filaments integral with, and extending longitudinally throughout, the composite structure, each filament having an inner core of a first material and an outer cladding of a second material which will be resistant to damage caused by foreign object penetration of the outer cladding material. A further object of my invention is to provide a composite metallic structure characterized by high tensile strength and superior resistance to contamination by hostile agents. In addition to providing superior resistance to contamination by the external environment, I have found that the propagation of cracks due to brittle failure in individual filament cores is substantially arrested by the composite structure of my invention. Accordingly, another object of my invention is to provide a composite structure which is capble of preventing the propagation of cracks due to brittle failure in a given segment of the structure.

One feature of my invention resides in the formation of a honey-comb-type matrix of contamination resistant material, the individual cells of which contain the second material intimately bonded to the first material and protected from the external environment by the first material. Another feature of my invention resides in the provision of a plurality of filaments of material of desirable strength characteristics, integrally extrusion-bonded within a composite structure, each of the filaments being isolated from the external environment.

DETAILED DESCRIPTION OF THE INVENTION

The above and other objects and features of my invention will become more readily apparent when taken in connection with the detailed description of the drawings in which.

Figure 1:
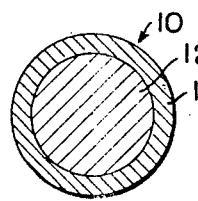
FIG. 1 is a cross-sectional view in schematic form of a filament comprising a cylindrical core of a first material cladded with an outer shell of a second materia.

FIG. 1 of the drawings is a cross-sectional view of a composite structure which is known in the prior art and which is used in the practice of my invention. As shown therein, an elongated cylindrical rod or filament 10 is formed from an extended inner core 12 of a first material around which is formed an extended shell 14 of a second material. The core 12 may be a solid rod of a relatively homogeneous material while the shell 14 may have the form of a tube snugly fitted around the core or may be formed around the core by other methods, such as by plasma-jet spraying. The core 12 is selected from those materials having the characteristics which it is desired to impart to the structure in which the material is incorporated while the shell 14 is selected to provide adequate isolation of the core from the external environment. For applications in which the combined properties of very high tensile strength at elevated temperatures and superior resistance to contamination by contaminants such as oxygen, sulphur, etc. is desired, the core 12 may advantageously be formed from material such as molybdenum and its alloys, (e.g., molybdenum-0.5 titanium, TZM, etc), columbium and its alloys (e.g. D43, etc.) tungsten and its alloys (thoria dispersed tungsten) and other refractory materials, and super alloys such as nickel and cobalt base super alloys, Astraloy, IN-100, Mar M-302, L-605, and others. The shell 14 may advantageously use such materials as nickel-chrome, iron-chrome-aluminum compounds, alloys such as Hastelloys, hafnium based tantalum type alloys, refractory oxides, and similar materials. The inner core then provides the desired strength characteristics while the outer shell, which generally has less desirable strength characteristics, provides isolation for the inner core from the environment in which the combined materials are to operate. As used herein, the term "contamination-susceptible" material will be used to refer to a material which experiences a more severe degradation of performance on sustained exposure to its environment than the associated cladding material; the latter will be referred to hereinafter by the term "contamination-resistant" material.

Heretofore, the structure of FIG. 1, after the inner core 12 had been suitably bonded to the outer protective shell 14 such as by extrusion in a protected environment, was formed to its ultimate shape without further protection of the core 12. So long as the outer layer remained intact, the inner core was effectively protected against contamination by its environment and the structure of FIG. 1 fulfilled its functions effectively. If, however, even minute flaws developed in the outer shell due to impact damage by foreign objects, the core material was exposed to the contaminating environment and failure of the structure generally followed. In the case of materials such as molybdenum operating in jet aircraft engines at elevated temperatures (above 2000° F.), the inner core would sublimate through the flaw and the failure of the material would be catastrophic.

Figure 2:
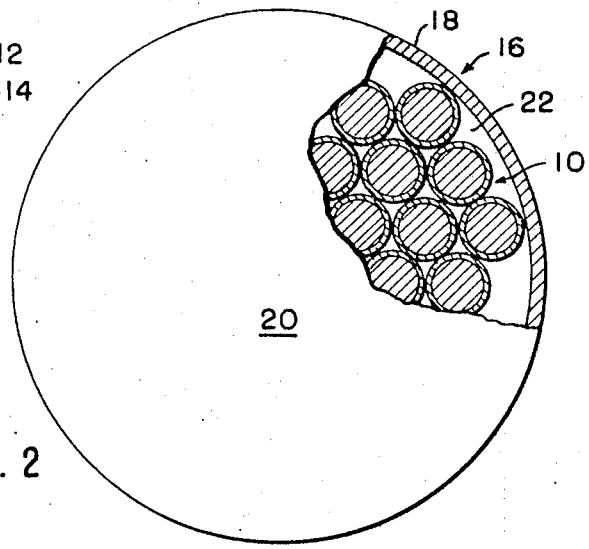
FIG. 2 is an end view, partially broken away, of a plurality of individual cladded cores of the type shown in FIG. 1 assembled in a cannister for extrusion.

I have found that an improved composite structure may be formed from filaments of the type shown in FIG. 1 by tightly packing a plurality of such filaments within a cannister or shell (preferably in a closely packed array) and extruding the resultant bundle of filaments to form a unitary billet of material in which each of the individual filaments is protected by a substantially uniform layer of protetcive material. A composite assembly of this type is shown in FIG. 2 which is an end view of a generally cylindrical cannister 16 having a relatively thin outer wall 18 of protective material of a desired type and having a pair of end walls, one of which is shown at 20. The filaments 10 extend longitudinally within the cannister parallel to its longitudinal axis and are assembled in a preferably closely packed array. The cannister 16 may be formed from the same type of material as the outer coating 14 of the filaments 10, or it may be formed from other compatible material or it may be expendable material which is later removed. After the filaments have been packed in the cannister, the unfilled spaces between the outer layer of filaments and the cannister wall 18 may be filled with similarly clad filaments of smaller diameter or with rods or fillers of the cladding material or other suitable material in order to form an assembly of clad rods which is tilghtly packed within the cannister. In order to obtain a uniform distribution of material during the extrusion process, the materials used for the core, the protective shell and the filler should have extrusion constants K (where K is the stiffness of the materials as defined by the relaton $P = K \ln R$ where P is the unit pressure on the structure to be extruded and R is the reduction in area to be obtained by extrusion) that are of the same order of magnitude and preferably within 25% of each other. This ensures that the resultant composite, after extrusion, will have an ordered, regular structure in which the filamentary rods of core material are evenly surrounded by the protective coating. The end faces of the cannister are then welded to the wall 18 and the cannister is evacuated to a relatively good vacuum (of the order of $10^{-3}$ torr or better) and sealed. The purpose of this is to allow the formation of a good metallurgical bond between the core material 12 and the shell 14, as well as between adjacent shells. To ensure the proper formation of the bond, all surfaces which are to be bonded together are kept strictly clean. In practice, these surfaces are cleaned with a suitable solvent such as ethyl alcohol to remove surface contamination. In some cases it will be found necessary to remove oxide surface layers by other techniques such as by machining the surfaces to remove oxides and other contaminants and preparing the packed cannister in a protected environment.

Figure 3:
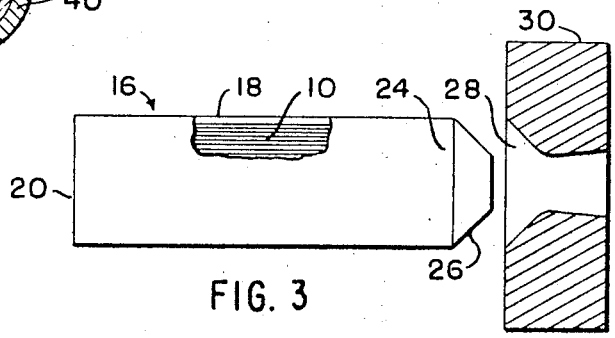
FIG. 3 is a diagrammatic view of the cannister shown in FIG. 2 as it is brought into contact with the extrusion die.

FIG. 3 is a schematic diagram showing a side view of a canister, partially broken away, which has been packed with the filaments of FIG. 1 and which is prepared for extrusion. As shown in FIG. 3, the canister 16 has end walls 20 and 24 at least one of which is welded or otherwise sealed to the outer wall 18 after the clad filaments 10 have been inserted. Abutting the end wall 24 is a solid guide element 26 in the form of a truncated cone which is firmly attached to the end wall 24 as by welding. The guide 26 may be formed of copper or other material and my serve the dual function of guiding the cannister 16 into an orifice 28 of a die 30 and of lubricating the pressure bearing surfaces of the die.

After the cannister 16 has been properly sealed and vacuated, it is heated to the temperature at which it is to be extruded, this temperature being maintained below the temperature of formation of any liquid phase between the metals being utilized. The cannister 16 is then forced into the die 30 by means of a hydraulic ram (not shown) to form the extruded billet. By extruding through dies which result in a sufficiently large area reduction ratio (for example, greater than 5 to 1), a strong bond will be formed between the core filament and its protective coating so that a unitary, integral structure will be obtained after the extrusion.

Figure 4:
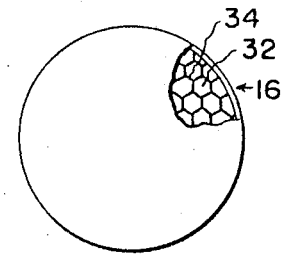
FIG. 4 is an end view, partially in section, of the cannister of FIG. 2 after extrusion.

FIG. 4 is an end view, partially broken away, of a typical cylindrical billet formed by this extrusion. As will be seen from the drawing, the individual filaments 10 have been deformed into substantially polygonal, regular filaments 32 embedded in a honeycomb-type matrix 34 formed by the bonding of the outer shell and the inner core of each of the filaments. The honeycomb-type matrix extends completely and substantially uniformly throughout the billet, thus forming a continuous extended cell network having an ordered structure which protects each of the individual filaments within the billet. This honeycomb-type structure, which is especially advantageous in that it provides a high degree of cladding protection with a minimum dilution of the core material, results from packing the filaments 10 within the cannister in a hexagonal close-packed array. If the initial packing is not closely packed, the shape of the matrix will, of course, depart from the ideal hexagonal cell structure shown in FIG. 4.

From FIG. 4 it will be noted that penetration of the outer shell 16 at a given point will expose only a single filament to its external environment through the protective shell, the shells covering the remaining fibers being left intact. Thus, weakening of the structure due to foreign object damage is localized in a single filament and failure of the complete structure is prevented. This is in strong contrast to protective techniques utilized in the prior art in which a weakening of the protective shell at any single point could ultimately cause the entire structure to fail.

Figure 5:
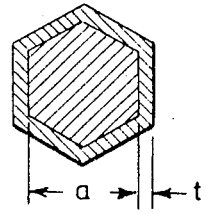
FIG. 5 is an enlarged diagrammatic view of an extruded cell of the type shown in FIG. 4.

FIG. 5 is a magnified view of a typical idealized cross section of one of the individual filaments depicted in FIG. 4. In order that the characteristics of the resultant billet may be determined mainly by the inner core material and not by the protective shell material, the thickness $t$ of the cell wall should be substantially less than the thickness $a$ of the inner core material. In general, the thickness of the cell in FIG. 5 may vary from 0.0001 inch to 0.015 inch, while the diameter of the inner core may vary from 0.001 inch to 0.250 inch. The thicknesses of the core and cell wall before extrusion will, of course, be larger by a factor of $\sqrt{R}$, where R is the reduction ratio of the extrusion process (R=cross-sectional area before extrusion/cross-sectional area after extrusion). The precise thickness of the cell wall will be dependent primarily upon the diameter of the core material and on the required protection against corrosion and penetration by foreign objects, as well as on the strength of the coating material and the ability to form thin coatings of controlled dimensions during subsequent processing. Cell walls of greater thickness may be used if the shell material itself possesses the desired characteristics of the resultant structure such as high tensile strength at elevated temperatures, etc. In general, the thickness of the protective shell should be such that less than 25% of the total cross sectional area of the billet is occupied by the shell material.

Figure 6:
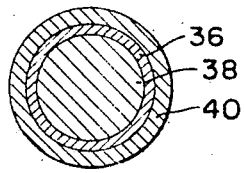
FIG. 6 is an end view of a filament comprising a cylindrical core having a "diffusion" layer interposed between the inner core and the outer protective shell.

In some cases it will be found that the inner core material and the outer shell materials are not compatible with each other. In cases such as this, it will be necessary to use an intermediate or "diffusion" barrier layer which is compatible with both the inner core material and the outer shell material and which is interposed between them as shown in FIG. 6 which is an end view of a cylindrical filament in which a diffusion layer 36 is interposed between an inner core 38 and an outer protective shell 40. Such a structure may advantageously be formed, for example, from a TZM molybdenum alloy core surrounded by an aluminum oxide or magnesium oxide shell and covered with an iron-chrome-aluminum-yttrium protective shell. The diffusion-barrier layer, after extrusion, will generally be of the order of 0.0002 to 0.005 inch thick. The inner core will, of course, be in the form of a cylindrical rod or filament while the diffusion-barrier shell and the outer shell may take the form of tubes snugly fitted to the preceding layer. Alternatively, the oxide shell may be formed by a plasma-jet spray. If a plurality of structures such as this are fitted into a cannister of approximately 6 inches in diameter and extruded through a 2 inch die, it will be found that the resultant composite material has excellent operating characteristics up to and including 2500° F. in an oxidizing environment.

Instead of starting with a filament having a single unclad core surrounded by one or more protective shells as is the case with the filaments shown in FIGS. 1 and 6, a multicore filament comprising a plurality of cylindrical cores fitted within a protective shell or shells may be utilized. After the filaments of this type are packed within the extrusion cannister and are extruded, the individual cores within each protective shell or shells will have the form of polygons which are bonded together within the shell, the cores adjacent the protective shell also being bonded to the shell. The individual filaments, comprising the multiple cores within the protective shell, will also have the form of polygons after extrusion. This type of composite structure will be found especially advantageous for materials whose tensile characteristics are improved by subdividing the load-bearing material into fibers of relatively small cross-sectional area.

Although the description up to this point has been concerned mainly with refractory materials and their alloys which possess superior properties at temperatures exceeding 2000° F., it will be apparent that my invention is equally applicable to other contamination-susceptible materials such as dispersion strengthened alloys and various super alloys such as nickel and cobalt base super alloys, Astraloy, IN-100, as Mar M-302, L-605, and others. For super alloys, a diffusion-barrier shell between the outer protective shell and the inner core material is generally not necessary; for dispersion strengthened alloys and for refractory materials, a diffusion barrier shell is advantageous and generally necessary.

Figure 7:
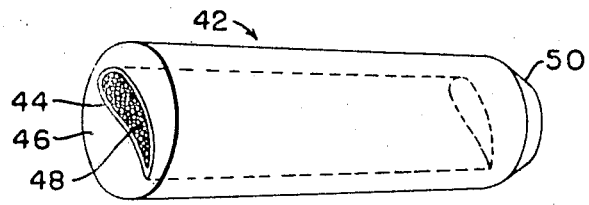
FIG. 7 is a pictorial view of a shaped billet which may be used to form shaped structures of the composite material of my invention.

Instead of extruding the materials into a billet, the structure of FIG. 2 may be extruded through a shaped die directly into the desired form, if this form is compatible with the shapes which may be extruded. A particularly advantageous method of doing this is by the "filled billet" technique illustrated in FIG. 7 of the drawings in which a billet 42 may have an inner shell 44 formed to the shape of the desired end product and extending longitudinally throughout the billet, the shell 44 being surrounded by filler material 46 to form a cylindrical billet. The shell 44 is formed from a protective material of the type described above in reference to FIG. 2 while the material 46 is an expendable material which is acid-etched or otherwise removed after extrusion. A plurality of combined structures of the type shown in FIGS. 1 or 6 are inserted within the shell 44 and are tightly packed within the shell, as was the case with the array of FIG. 2. Additional filaments of cladded material or protective material may be inserted within the shell to fill all vacancies. An end guide 50 is joined to the billet 42 in the same fashion as shown in FIG. 3 and the exposed end of the billet 42 is closed with an additional end cap (not shown) and sealed, the billet then being evacuated as previously described, heated, and extruded. It will be noted that the cladding material laterally surrounding the individual filaments 48 in FIG. 7 will itself form a surface shell enclosing the filaments after extrusion. Thus, in some instances, the additional shell 44 may be dispensed with and the clad filaments 48 may then be inserted directly inside the shaped core of the billet 42.

Figure 8:
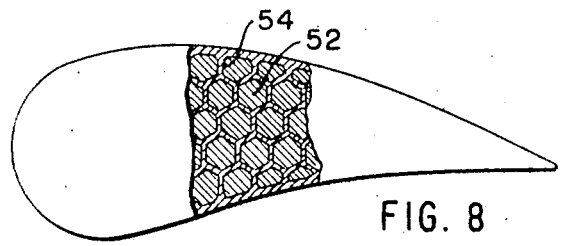
FIG. 8 is an end view, partially broken away, of a turbine blade such as may be formed from the composite structure of my invention.

The resultant extruded shape is shown in FIG. 8 which is a schematic diagram, partially in section, of an end view of an airfoil-shaped blade such as might be used in jet engines. The filaments 52 in this figure are shown extending longitudinally of the blade and are completely surrounded by a matrix 54 of protective material to which the filaments are intimately bonded by the extrusion process. Again, the matrix has the approximate form of a honeycomb which is substantially regular throughout the interior portion of the composite material and which is slightly distorted at the outer edges of the honeycomb toward the surface of the structure or where packing irregularities were originally introduced.

It will be noted that the billets or shaped structures formed by extrusion may be many times the overall length of the individual part which it is desired to form. Accordingly, it may be necessary to segment the billet or shaped structure into shorter lengths before the final product is obtained. In cases such as this, the segmented billet or resultant shaped structure will have exposed end sections which, in some cases, must be closed or otherwise sealed off to establish complete protection for the core filaments within the structure. This can readily be accomplished by known techniques such as, for example, by electron beam welding end plates to the composite structure and by thereafter hot-gas pressure bonding these plates to the structure.

Figure 9:
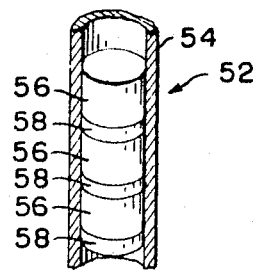
FIG. 9 is a side view, partially broken away, of an alternative form of my invention.

In the configurations so far described, it will be noted that the filaments to be protected are in the form of extended filaments which are cladded on their lateral surfaces only, the end surfaces of these filaments being cladded only after, and by means of, their packing into a cannister containing end walls of protective material. In situations in which it is desired to use segments of the billet or shaped structure shorter than the billet or shaped structure as extruded, it is necessary, with the structures so far described, to provide end face protection in many cases by sealing off the end faces with an end wall before extrusion and bounding this end fall to the composite structure. I have found that this final step may be dispensed with by forming the core filaments in shorter segments and by interposing segments or slugs of protective material between the end faces of the core filaments as the filaments are inserted within the outer layer of lateral cladding material. An example of a structure of this type is shown in FIG. 9 in which a composite structure 52 is formed by an outer shell of protective material 54 in the form of a cylindrical tube containing a plurality of segments 56 of core material axially separated at the end faces thereof by spacers or slugs 58 of additional protective material. The spacers 58 will generally be maintained relatively thin in comparison to the axial dimensions of the segments 56 in order to insure that the composite structure has the strength or other defining characteristics of the core material 56. A composite structure of this type is, of course, more difficult and more expensive to form than the types shown in FIGS. 1 and 6 but possesses the additional advantage that the base material is completely surrounded by protective material on all sides, thus greatly decreasing the amount of material exposed to a contaminating environment when the protective shell is pierced at any point. Although I have shown the composite structure of FIG. 9 with only a single protective shell and with only a single spacer 58 intermediate the end walls of the segments 56, it will be apparent that diffusion layers may be interposed between the lateral surfaces of the segments 56 and the shell 54 as well as between the end surfaces of the segments of 56 and the spacers 58 in a manner similar to that shown in FIG. 6.

So far I have described the novel composite structures of my invention as being advantageous pirmarily for protection of various materials from adverse environments. However, my invention is not so limited and serves equally well to prevent structural failures which are caused by sources other than contamination by the external environment. For example, it is well known that the material beryllium has excellent tensile and stiffness characteristics but is extremely brittle, this adverse characteristic preventing more frequent application of this material in aerospace technology. I have found that the propagation of cracks in beryllium and similar brittle materials may readily be localized by embedding the beryllium within a crack-arresting matrix similar to that provided for refractory or super alloy materials which are to be protected from the external corrosive, contaminating environment. In such a case, cracks propagating through any single beryllium filament will be arrested at the interface between the beryllium and the ductile matrix in which the beryllium is embedded, thus confining the crack to a single cell. In this manner, weakening of the entire structure due to the initiation and propagation of a crack at a single point within that structure is completely prevented.

From the above it will be apparent that I have provided a novel composite structure for isolating a given material from its external environment and for localizing failures in the protected material (such as failures due to contamination by the external environment or failures due to crack propagation in brittle materials). Although my invention has been described largely in terms of composite metallic structures, it will be apparent that my invention is not so limited. For example, the protected or core material may utilize either a metal or a metal alloy while the protective shell or cladding material may utilize a metal, a metal alloy, an oxide, or (in some cases) an organic material such as a plastic. For this reason, the term "metal-based" material will be used in the claims to denote a material that may comprise either a metal, a metal alloy, or a metal oxide. Further, the term "environment-susceptible material" will be used in the claims to refer to a material which either is especially susceptible to the propagation of brittle fracture through it when not isolated from adjacent fracture-inducing materials or which is readily "contaminated" by the external environment under its conditions of intended use when not isolated from the environment. The term "environment-resistant" will be used herein to refer to materials which do not suffer from these limitations and which therefore serve as protective agents when used as cladding for the environment-susceptible materials as taught herein.

Having described my invention, I claim:

1. A composite metal-based structure having increased strength at high temperatures comprising, in combination, a plurality of cores of a first metal-based material having extended high temperature strength but readily susceptible to failure by sulfidation, oxidation, or brittle fracture, said first material being chosen from the class consisting of beryllium, molybdenum, columbium, titanium, tungsten, and their respective alloys, and nickel and cobalt base super alloys, each of said cores being enclosed within a separate cell of a regular cellular matrix completely and uniformly surrounding said cores and isolating them from each other, the adjacent surfaces of said first and second materials being characterized by a uniform coextrusion bond therebetween, said second material having a lesser high temperature strength but being more resistant to failure by sulfidation, oxidation, or brittle fracture, and being chosen from the class consisting of aluminum and its alloys, nickel-chrome alloys, hafnium-based alloys, and refractory oxides and metals.

2. The combination defined in claim 1 in which said matrix is a honeycomb-type structure having a plurality of polygonal cells, each of said cells being occupied by one said core.

3. The combination defined in claim 2 in which said first and second materials are bonded directly to each other.

4. The combination defined in claim 2 in which a third metal-based material compatible with said first and second materials is interposed therebetween, said third material being bonded to both said first and second materials.

5. The combination defined in claim 2 in which said first material is a high strength, contamination-susceptible material and said second material is a contamination-resistant material whereby said cores are contamination-isolated from other cores and from their external environment.

6. The combination defined in claim 2 in which said first material is a relatively brittle material and in which said second material is a relatively ductile metal isolating the propagation of cracks resulting from brittle failures from one core to other cores.

7. The combination defined in claim 6 in which said first material is a beryllium-based material while said second material is an aluminum-based material.

8. The combination defined in claim 1 in which the wall thickness of said cells is of the order of from 0.0001 to 0.015 inch.

9. A composite metal-based structure comprising, in combination, a plurality of cores of a first environment-susceptible metal-based material tightly packed in a continuous ordered matrix of a second environment-resistant metal-based material completely and uniformly surrounding each of said cores and isolating them from each other, said matrix forming a honeycomb-type structure having a substantially regular cellular structure, each of said cells being occupied by a plurality of core segments aligned end to end and having protective segments axially interposed between adjacent core segments, the volume accupied by said second metal-based material being less than 25% of the total volume occupied by both said first and second metal-based materials, said first and second materials being uniformly extrusion bonded to each other within said structure.

10. A composite metal-based structure comprising, in combination, pluralities of cores of a first environment-susceptible metal-based material tightly packed in a continuous ordered matrix of a second environment-resistant metal-based material completely and uniformly surrounding each of said pluralities of cores and isolating them from each other, said matrix having a substantially regular, cellular structure of the honeycomb-type, each cell enclosing a plurality of extended cores isolated from each other by the walls of said cells, the volume occupied by said second metal-based material being less than 25% of the total volume occupied by both said first and second metal-based materials, said first and second materials being uniformly extrusion bonded to each other within said structure.

References Cited
UNITED STATES PATENTS

| | | | |
|---|---|---|---|
| 2,499,977 | 3/1950 | Scott | 148—4 |
| 2,619,438 | 11/1952 | Varian et al. | 148—4 |
| 3,098,723 | 7/1963 | Micks | 29—191.6X |
| 3,131,469 | 5/1964 | Glaze | 29—191X |
| 3,153,279 | 10/1964 | Chessin | 29—191.6X |
| 3,159,460 | 12/1964 | Hill | 29—191.6 |
| 3,222,144 | 12/1965 | Davenport | 29—191 |

L. DEWAYNE RUTLEDGE, Primary Examiner

E. L. WEISE, Assistant Examiner

U.S. Cl. X.R.

29—191.6; 72—258; 244—123